(12) United States Patent
Mickens et al.

(10) Patent No.: US 9,716,743 B2
(45) Date of Patent: Jul. 25, 2017

(54) ACCESSING HARDWARE DEVICES USING WEB SERVER ABSTRACTIONS

(75) Inventors: James Mickens, Bellevue, WA (US); David Chu, Bellevue, WA (US); Li Zhuang, Los Altos, CA (US); Kaisen Lin, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 13/224,337

(22) Filed: Sep. 2, 2011

(65) Prior Publication Data
US 2013/0060905 A1   Mar. 7, 2013

(51) Int. Cl.
    *H04L 29/08*   (2006.01)
(52) U.S. Cl.
    CPC .................. *H04L 67/025* (2013.01)
(58) Field of Classification Search
    CPC ............ H04L 9/32; H04L 67/25; G06F 15/16
    USPC .......................................................... 709/219
    See application file for complete search history.

(56) References Cited

U.S. PATENT DOCUMENTS

| | | | |
|---|---|---|---|
| 7,185,014 B1* | 2/2007 | Hansen | G06F 17/30861 |
| 7,379,998 B2 | 5/2008 | Love et al. | |
| 7,797,376 B1* | 9/2010 | Desai | 709/203 |
| 8,499,070 B2* | 7/2013 | Roth | H04L 12/2602 370/401 |
| 8,504,654 B1* | 8/2013 | Kominac | H04L 67/08 709/217 |
| 2002/0026500 A1* | 2/2002 | Kanefsky | H04M 1/72561 709/219 |
| 2003/0009588 A1* | 1/2003 | Bodlaender | H04L 12/2803 709/238 |

(Continued)

FOREIGN PATENT DOCUMENTS

IL   WO 2009090638 A1 *   7/2009 ........... G06F 21/128

OTHER PUBLICATIONS

Patel, et al., "Remote Access of Peripherals using Web Server on FPGA Platform", Retrieved at <<http://ieeexplore.ieee.org/stamp/stamp.jsp?tp=&arnumber=5460557, International Conference on Recent Trends in Information, Telecommunication and Computing, Mar. 12-13, 2010, pp. 274-276.

(Continued)

*Primary Examiner* — Uzma Alam
(74) *Attorney, Agent, or Firm* — Singh Law, PLLC; Ranjeev K. Singh

(57) ABSTRACT

In the new architecture, a client that desires access to a piece of hardware sends HTTP requests to a device server. The server receives a HTTP requests, accesses a device on behalf of the client, and send the device's response back to the client in the form of an HTTP response. This architecture has three primary advantages. First, it offers a clean interface for clients where all devices are accessed as if they are web servers. Second, it helps make devices more secure whereby clients can be prevented from accessing hardware directly, and all device access is forced through the narrow HTTP access protocol and checked for compliance with a desired security policy. Third, since HTTP allows local and remote servers to be contacted, the proposed architecture makes it easy for clients to communicate with devices that are not physically co-resident with the client but which are accessible via a network connection.

17 Claims, 6 Drawing Sheets

(56) References Cited

U.S. PATENT DOCUMENTS

| | | | |
|---|---|---|---|
| 2003/0191826 A1* | 10/2003 | Bellinger | G06F 9/4411 709/220 |
| 2004/0136388 A1* | 7/2004 | Schaff | 370/401 |
| 2004/0153501 A1* | 8/2004 | Yamashita | H04L 67/02 709/203 |
| 2005/0033656 A1* | 2/2005 | Wang et al. | 705/26 |
| 2005/0114766 A1* | 5/2005 | Yamamoto | G06F 17/30905 715/277 |
| 2005/0138117 A1* | 6/2005 | Chaney | G06F 17/30864 709/203 |
| 2005/0246723 A1* | 11/2005 | Bhesania | 719/321 |
| 2005/0273846 A1* | 12/2005 | Hawkins | H04L 63/02 726/11 |
| 2006/0133392 A1* | 6/2006 | Ajitomi | H04L 12/2803 370/401 |
| 2006/0149811 A1* | 7/2006 | Bennett et al. | 709/203 |
| 2006/0153072 A1* | 7/2006 | Bushmitch | H04L 12/2805 370/230 |
| 2008/0049779 A1* | 2/2008 | Hopmann | H04L 12/2807 370/431 |
| 2009/0074184 A1* | 3/2009 | Baum | G06F 17/30017 380/205 |
| 2009/0100147 A1* | 4/2009 | Igarashi | H04N 7/17309 709/218 |
| 2009/0100176 A1* | 4/2009 | Hicks, III | G06F 15/16 709/224 |
| 2009/0100178 A1* | 4/2009 | Gonzales | G06F 9/50 709/226 |
| 2009/0144359 A1* | 6/2009 | Karlsen | H04L 67/26 709/203 |
| 2009/0203375 A1* | 8/2009 | Gisby et al. | 455/426.1 |
| 2009/0296657 A1* | 12/2009 | Omar et al. | 370/331 |
| 2009/0327827 A1* | 12/2009 | L'Heureux et al. | 714/748 |
| 2010/0017717 A1* | 1/2010 | Nakanishi | G06F 9/4443 715/719 |
| 2010/0107222 A1* | 4/2010 | Glasser | 726/3 |
| 2010/0121968 A1* | 5/2010 | Clark | H04L 12/2818 709/230 |
| 2010/0125729 A1* | 5/2010 | Baentsch | H04L 63/0471 713/151 |
| 2010/0142515 A1* | 6/2010 | Jana | H04L 65/1069 370/352 |
| 2010/0210240 A1* | 8/2010 | Mahaffey | H04L 41/0253 455/411 |
| 2010/0283579 A1* | 11/2010 | Kraus | G07C 9/00944 340/5.7 |
| 2010/0332615 A1* | 12/2010 | Short et al. | 709/217 |
| 2011/0047033 A1* | 2/2011 | Mahaffey | G06Q 30/0269 705/14.66 |
| 2011/0173681 A1* | 7/2011 | Qureshi | H04L 63/0823 726/4 |
| 2012/0069131 A1* | 3/2012 | Abelow | 348/14.01 |
| 2012/0113459 A1* | 5/2012 | Williams | G06F 3/1206 358/1.15 |
| 2012/0124384 A1* | 5/2012 | Livni et al. | 713/178 |
| 2012/0151373 A1* | 6/2012 | Kominac | G06F 17/30905 715/740 |
| 2012/0324094 A1* | 12/2012 | Wyatt et al. | 709/224 |

OTHER PUBLICATIONS

"Accessing hardware from within Internet Explorer", Retrieved at http://stackoverflow.com/questions/504730/accessing-hardware-from-within-internet-explorer>>, Retrieved Date: Mar. 14, 2011, pp. 2.

"Device Independence Activity Statement", Retrieved at <<http://www.w3.org/2001/di/Activity>>, Retrieved Date: Mar. 14, 2011, pp. 2.

Robbins, Thomas, "Mobile Web Development with ASP.NET 2.0", Retrieved at <<http://blogs.msdn.com/b/trobbins/archive/2007/07/13/mobile-web-development-with-asp-net-2-0.aspx, Jul. 13, 2007, pp. 34.

"Mini Web Server creeps through the firewall", Retrieved at http://nabto.com/defaultasp? Site=News&news_id=170&print=news>>, Sep. 19, 2010, pp. 5.

Allen, Mitch, "Palm webOS: The Insider's Guide to Developing Applications in JavaScript using the Palm Mojo Framework", Retrieved at <<http://posterous.com/getfile/files.posterous.com/ddenson/ETI3OBsZbpISZxQW2LAPkfdlf0eqzRB4IiHfdeyh2ZIW5pON1pDTMmJ1BN4H/webos_chap1.pdf>>, Aug. 2009, pp. 26.

"Apple iPhone App Store", retrieved at <<http://www.apple.com/iphone/apps-for-iphone/>>, Mar. 11, 2011, p. 1.

"i-Jetty: Webserver for the Android Mobile Platform", Retrieved at http://code.google.com/p/i-jetty, Retrieved at: Mar. 11, 2011, pp. 2.

Daniel, et al., "Engineering Heap Overflow Exploits with JavaScript", Retrieved at <<http://securityevaluators.com/files/papers/isewoot08.pdf>>, Proceedings of the 2nd conference on USENIX Workshop on offensive technologies, Sep. 8, 2008, pp. 1-10.

Enck, et al., "TaintDroid: An Information-flow Tracking System for Realtime Privacy Monitoring on Smartphones", Retrieved <<at http://www.appanalysis.org/tdroid10.pdf>>, Proceedings of the 9th Usenix Symposium on Operating Systems Design and Implementation, 2010, pp. 1-15.

Fielding, et al., "Hypertext Transfer Protocol—Http/1.1", Retrieved at <<http://www.javvin.com/protocol/rfc2616.pdf, Jun. 1999, pp. 1-105.

"Android Market Place", Retrieved at <<http://www.android.com/market/>>, Retrieved Date: Mar. 3, 2011, pp. 2.

Grier, et al., "Secure Web Browsing with the OP Web Browser", Retrieved at <<http://ieeexplore.ieee.org/stamp/stamp.jsp?tp=&arnumber=4531167>>, IEEE Symposium on Security and Privacy, 2008, pp. 402-416.

Hickson, Ian, "HTML Device: An addition to HTML", Retrieved at <<http://dev.w3.org/html5/html-device/>>.

Hickson, Ian, "HTML5: A Vocabulary and Associated APIs for HTML and XHTML", Retrieved at <<http://dev.w3.org/html5/spec/>>, Mar. 5, 2011, pp. 20.

Hickson, Ian, "Web Storage: Editor's Draft", Retrieved at <<http://dev.w3.org/html5/webstorage>>, Feb. 28, 2011, pp. 22.

Hickson, Ian, "WebWorkers Whatwg Draft Specification", Retrieved at <<http://www.whatwg.org/specs/web-workers/current-work/>>, Retrieved at: Mar. 11, 2011, pp. 29.

Howell, et al., "What You See is What They Get: Protecting Users from Unwanted Use of Microphones, Cameras, and Other Sensors", Retrieved at <<http://research.microsoft.com/pubs/131132/devices-camera-ready.pdf>>, May 24, 2010, pp. 9.

Humphrey, et al., "Mozilla Audio Data API", Retrieved at <<https://wiki.mozilla.org/Audio_Data_API>>, Retrieved date: Mar. 11, 2011, pp. 14.

Arghire, Ionut, "Imagination's PowerVR SGX543 Quad-Core GPU at CES 2009", Retrieved at <<http://news.softpedia.com/news/Imagination-039-s-PowerVR-SGX543-Quad-Core-GPU-at-CES-2009-101599.shtml<<, Jan. 9, 2009, pp. 2.

"Khronos Group", Retrieved at http://www.khronos.org/opencl>>, Retrieved date: Mar. 11, 2011, pp. 5.

Koukoumidis, et al., "Improving Mobile Search User Experience with SONGO", Retrieved at <<http://research.microsoft.com/pubs/120317/SONGO_TR.pdf>>, Feb. 18, 2010, pp. 1-14.

"How to Write a Pacman Game in JavaScript", Retrieved at <<http://www.masswerk.at/JavaPac/pacman-howto.html>>, Retrieved at: Mar. 14, 2011, pp. 34.

Lu, et al., "Soundsense: Scalable Sound Sensing for People-centric Applications on Mobile Phones", Retrieved at <<http://www.cse.psu.edu/~gcao/teach/598/s3_mobisys09.pdf, Proceedings of the 7th international conference on Mobile systems, applications, and services, Jun. 22-25, 2009, pp. 14.

"Mapquest", Retrieved at <<http://www.mapquest.com/>>, Retrieved Date: Mar. 11, 2011, pp. 2.

Masinter, L., "The "Data" URL Scheme", Retrieved at <<http://tools.ietf.org/pdf/rfc2397.pdf>>, Aug. 1998, pp. 6.

"Monsoon Solutions Inc", Retrieved at <<https://www.msoon.com/LabEquipment/PowerMonitor/>>, Retrieved Date: Mar. 11, 2011, p. 1.

(56) References Cited

OTHER PUBLICATIONS

"Mozilla", Retrieved at <<http://www.mozilla.org/rhino/>>, Retrieved Date: Mar. 11, 2011, pp. 3.
"Nike+", Retrieved at http://nikerunning.nike.com/nikeos/p/nikeplus/en_US/>>, Retrieved Date: Mar. 14, 2011, p. 1.
"Nintendo wii", Retrieved at <<http://www.nintendo.com/wii>>, Retrieved Date: Mar. 14, 2011, pp. 5.
"Phonegap", Retrieved at <<http://www.phonegap.com/>>, Retrieved Date: Mar. 11, 2011, pp. 2.
Popescu, Andrei, "Geolocation API Specification", Retrieved at <<http://dev.w3.org/geo/api/spec-source.html>>, Feb. 10, 2010, pp. 18.
Pryantha, et al., "Tiny Web Services for Sensor Device Interoperability", Retrieved at <<http://ieeexplore.ieee.org/stamp/stamp.jsp?tp=&arnumber=4505520>>, Proceedings of the 7th international conference on Information processing in sensor networks, 2008, pp. 567-568.
Provos, et al., "Preventing Privilege Escalation", Retrieved at <<http://www.citi.umich.edu/u/provos/papers/privsep.pdf>>, Proceedings of the 12th conference on USENIX Security Symposium, vol. 12, 2003, pp. 11.
Ratanaworabhan, et al., "Nozzle: A Defense against Heap-spraying Code Injection Attacks", Retrieved at <<http://www.usenix.org/events/sec09/tech/full_papers/ratanaworabhan.pdf>>, Proceedings of the 18th conference on USENIX security symposium, 2009, pp. 18.
"Secunia", Retrieved at <<http://secunia.com/advisories/29787>>, Apr. 21 2008, pp. 3.
"Pixastic: Javascript Image Processing Library", Retrieved at http://www.pixastic.com, Mar. 11, 2011, p. 1.
"Shazam Entertainment. Shazam", Retrieved at <<http://www.shazam.com/>>, Mar. 14, 2011, p. 1.
Tang, et al., "Trust and Protection in the Illinois Browser Operating System", Retrieved at <<http://www.cs.uiuc.edu/homes/stang6/file/ibos-osdi10.pdf>>, Proceedings of the 9th USENIX conference on Operating systems design and implementation, Oct. 2010, pp. 1-15.
Vixie, et al., "Dynamic Updates in the Domain Name System (DNS Update)", Retrieved at <<http://xml.resource.org/public/rfc/html/rfc2136.html>>, Apr. 1997, pp. 19.
Kesteren, Anne Van, "W3C Cross-origin Resource Sharing", Retrieved at <<http://www.w3.org/TR/cors/>>, Retrieved date: Mar. 11, 2011, pp. 22.
Wang, et al., "The Multi-principal OS Construction of the Gazelle Web Browser", Retrieved at <<http://www.usenix.org/events/sec09/tech/full_papers/wang.pdf>>, Proceedings of the 18th conference on USENIX security symposium, 2009, pp. 16.
Wang, et al., "Convergence of Desktop and Web Applications on a Multi-service OS", Retrieved at <<http://www.usenix.org/event/hotsec09/tech/full_papers/wang.pdf>>, Proceedings of the 4th USENIX conference on Hot topics in security, 2009, pp. 1-6.
"TheWebKit Open Source Project", Retrieved at <<http://webkit.org/>>, Mar. 11, 2011, p. 1.
Yumerefendi, et al., "Tightlip: Keeping Applications from Spilling the Beans", Retrieved at <<http://www.cs.duke.edu/~lpcox/nsdi07/tightlip-nsdi07.pdf>>, Proceedings of the 4th USENIX Symposium on Networked Systems Design & Implementation, 2007, pp. 1-14.

* cited by examiner

ACCESSING HARDWARE DEVICES USING WEB SERVER ABSTRACTIONS

BACKGROUND

Since its origins in the 1960s and commercialization in the 1990s, the Internet has expanded worldwide to become ubiquitous in social and business activities. When combined with wireless and high speed data links, many new applications have emerged. While the Internet was initially conceived as a communication medium for collaboration between users and applications, it relied on early web browsers that were limited to displaying static content to users. Web browsers now provide an increasingly rich execution platform that supports a variety of programming languages which allow web pages to respond to user input, dynamically update display screens, and issue asynchronous requests for new information. Web browsers can receive and transmit information between applications and the web browsers over the Internet in near real-time. Examples of these applications include handheld game controllers, meteorological data collection sites, webcam devices, and mobile phones and tablet computers that include cameras, Global Positioning System (GPS) receivers and removable data storage.

Despite increased sophistication and complexity of these applications, web browsers have been slow to allow low-level hardware devices to be accessed using JavaScript, the most popular client-side scripting language. This limitation has become particularly problematic as mobile processing units such as cellular phones and tablet computers include applications that leverage data from hardware devices including accelerometers, GPS receivers and removable storage. Concurrently, mobile processing units include increasingly powerful computational and storage capabilities. As the use of such mobile processing units increase, the requirement to access data from hardware devices will also increase.

In General, software programs must access hardware devices to interact with the outside world. Examples of hardware devices include hard disks, computer monitors, accelerometers, cameras, and microphones. Programs typically access hardware directly through the use of low-level assembly instructions, or indirectly through services provided by the underlying operating system. These traditional ways of device access are problematic for three reasons. First, these low-level programming interfaces are often inconsistent and difficult to use, making it hard for developers to write programs that access hardware in sophisticated ways. Second, these programming interfaces often grant the software program wide-ranging capabilities to read and write to hardware devices. If the software program is buggy or malicious, it can wreak havoc with other programs and the user's data through the improper use of hardware devices. Third, low-level interfaces make it difficult for programs to interact with devices that are not directly co-located with the machine that is running a software program. For example, accessing a locally resident microphone is easily expressed, but accessing a microphone on a remote machine is difficult to express or impossible.

Ideally, applications could access hardware devices in a location-agnostic way using network protocols. These protocols would provide a narrow, simple interface, making them easy to secure and obviating the need for a large trusted computing base such as a browser.

SUMMARY

The invention disclosed herein solves the problems discussed above by introducing a new programming model. Within this model, hardware devices are treated like a web server where client programs access the devices by sending Hypertext Transfer Protocol (HTTP) requests to the devices. More specifically, a program known as a hardware device server acts as an intermediary between a client program and each hardware device. To access a particular device, a client program sends an HTTP request to an appropriate hardware device server. The hardware device server examines the request and authenticates the client in some way. If the authentication is successful, the hardware device server accesses the particular hardware device as specified by the client program, and returns a result in a HTTP response sent to the requesting client program.

This architecture solves the three problems identified earlier. First, the programming interface is much cleaner, since all hardware devices are uniformly presented to client applications as web servers which use HTTP as a communication protocol. Second, the new architecture improves security, since clients can be sandboxed (i.e., prevented from directly accessing hardware). The hardware device server can prevent unauthorized access by safeguarding the narrow HTTP protocol. Third, since HTTP can trivially be used to access both local and remote web servers, the new architecture makes it trivial for clients to access local and remote devices in the same way.

One embodiment of the disclosed invention allows a web page to securely access hardware devices. The web page can include a device protocol translator which engages an HTTP device protocol with hardware device servers running locally or on remote machines. To access hardware, the page passes a request to the device protocol translator. The device protocol translator crafts the appropriate HTTP request and sends it to the hardware device server. If the requests are authorized, the hardware device server performs the requested actions and returns any data and status information to the requesting web page using a standard HTTP response. The device commands and responses may or may not include data. Users may authorize individual web domains to access each hardware device, and the hardware device server may authenticate each hardware request by ensuring that an HTTP referrer field represents an authorized domain. The device server may also inform the user about which domains are currently authorized and actively using the system. For example, the device server may use sensor widgets, which are small graphical icons that change their visual appearance and make a sound when hardware devices are accessed.

A hardware device server is a computing device implemented in either hardware or software that enables applications to access hardware devices by issuing HTTP requests to the hardware device server. A device protocol translator may provide an API to a web application which allows the web application to issue high-level device requests without having to know the low-level details of the HTTP device access protocol. The device protocol translator may be implemented by a JavaScript library. The hardware device server is an application which runs in a separate process on a local or remote machine. The hardware device server may receive commands from the device protocol translator, process the commands and cause designated hardware devices to respond according to the commands. To access hardware devices, applications or device protocol translators send hardware device requests to the hardware device server in the form of HTTP requests and, if the requests are authorized, the hardware device server performs the requested actions and returns any data and status information to the requesting web page with a standard HTTP response. The device commands and responses may or may not include data. Users may authorize individual web domains to access each hardware device, and the hardware device server authenticates each hardware request by ensuring that a requester represents an authorized domain.

The hardware device server does not require an associated browser to be trustworthy, and indeed, the user or the device server itself can sandbox the browser such that the browser cannot access hardware devices directly, and instead must access all such devices using the HTTP access protocol; in this fashion, the device server tightly restricts what the browser can and cannot do. However, a corrupted or malicious browser which contains snooped referrer fields from authorized user requests can send requests to the hardware device server. The hardware device server may use authentication processes to limit these attacks. Methods for authentication and authorization may include manifest authorization, security token exchanges, sensor widget notifications and iframes for device handling encapsulation. Before a web page can access hardware devices, it is desirable that any request be authenticated by the hardware device server.

This Summary is provided to introduce a selection of concepts in a simplified form that are further described below in the Detailed Description. This Summary is not intended to identify key features or essential features of the claimed matter, nor is it intended to be used to limit the scope of the claimed subject matter.

BRIEF DESCRIPTION OF THE DRAWINGS

These and other features, aspects and advantages of the present invention will become better understood with regard to the following description and accompanying drawings wherein.

DETAILED DESCRIPTION

Figure 1A:
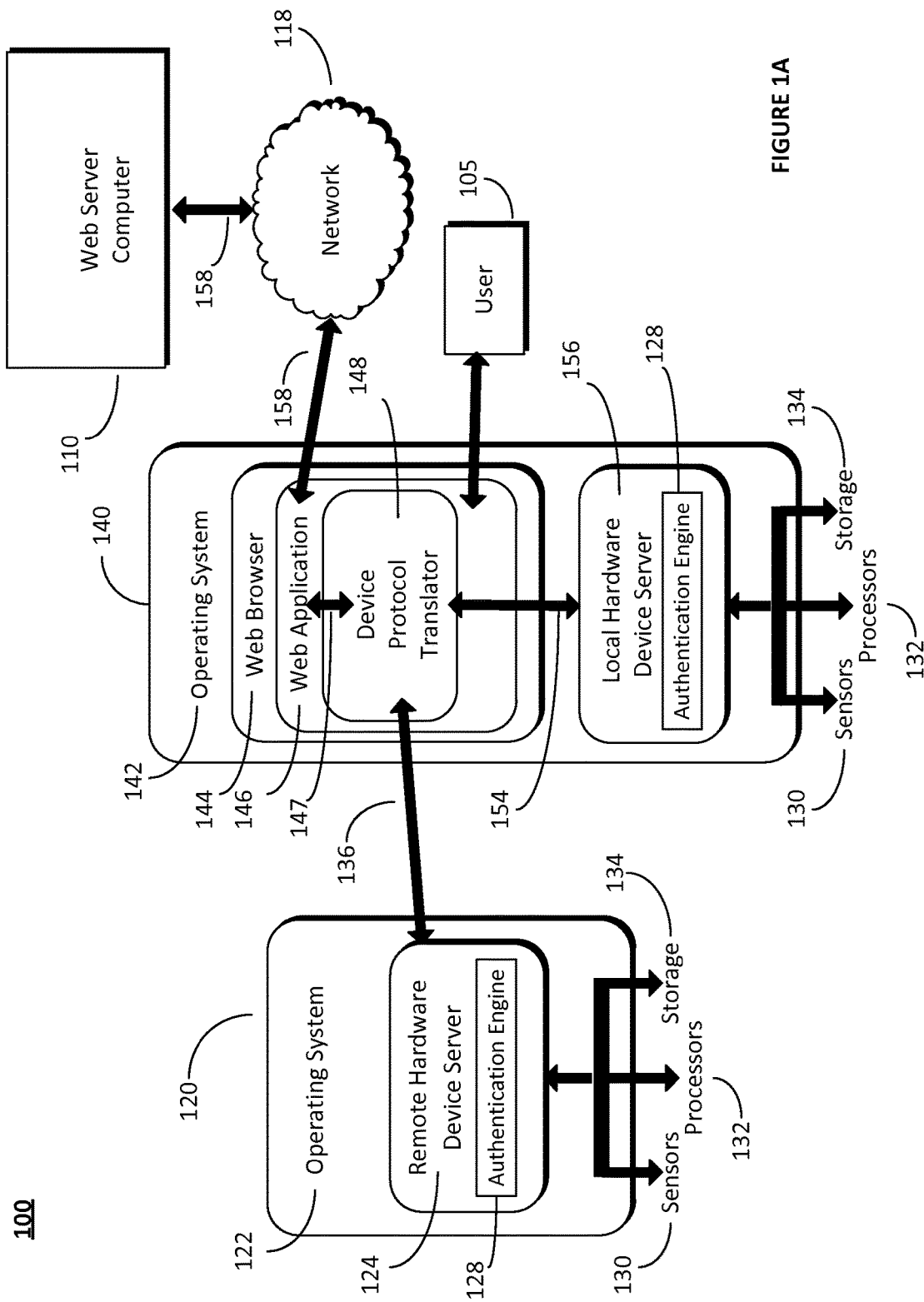
FIG. 1A is a functional diagram of a software architecture with a web server computer connected to a processing unit and a remotely connected processing unit attached to the processing unit for controlling sensors, processors and storage devices over the Internet.

The disclosed hardware device server may be a software program or equivalent hardware implementation that enables applications to access hardware devices in a manner similar to that used for accessing a web server. The hardware device server acts as a mediator between software applications and hardware devices enabling the hardware devices to be accessed by HTTP network protocols. The platform containing a hardware device of interest runs the hardware device server, which is a small program that exposes an externally visible web server interface to software applications. Other software applications may access a hardware device by sending HTTP requests to a hardware device server associated with the targeted hardware device. The hardware device server accesses the hardware on behalf of the requesting software application and sends a HTTP response back to the requesting software application. The hardware device server may or may not reside on the same platform as the requesting software application. Thus, a requesting software application may use the same HTTP protocol to access local devices and remote devices.

The following detailed description illustrates a very specific implementation of the hardware and software environment surrounding the disclosed hardware device server that is illustrated in the context of an Internet application accessing a web page running within a browser, and communicating with hardware devices using a HTTP protocol. Note, however, that the core inventive entity is not the specific implementation including the Internet and a web server. The disclosed invention describes the notion of an abstract client application, such as a web page, a C program, or a Python program, accessing hardware via HTTP messages exchanged with a hardware device server in order to access hardware devices associated with the hardware device server. It should be noted that the disclosed device server may be a standalone software program or an equivalent hardware implementation.

Software Architecture

This detailed description below is directed to methods, systems and devices that are particularly useful for accessing local sensors, processors and storage devices by processing units that may be accessed via a HTTP protocol interface. It includes descriptions of hardware and software architectures, application programming interface (API) calls for accessing sensors, processors and storage devices, authentication of hardware requests, and hardware device server implementation. These methods, systems and devices rely on a hardware device server that includes an interface to the localhost domain which uses HTTP Internet protocol as a hardware access protocol for accessing hardware devices, such as sensors, processors and storage devices. The hardware device server is a relatively simple native code application that runs in a separate process on the local machine and exports a web server interface on the localhost domain. This configuration provides device-aware, cross-platform web pages that require no installation and whose security does not depend on a huge trusted computing base such as a web browser.

FIG. 1A is a functional diagram of a software architecture 100, where a web server computer 110 connected to a user's machine 140 via a network 118 using HTTP Internet protocol for communication 158. The user's machine 140 includes an operating system 142 that provides services to a web browser 144, and the web browser enables operation of the web application 146. The web application 146 accesses a local hardware device server 156 and a remote hardware device server 124 via a device protocol translator 148. After the web server computer 110 delivers a web application 146 to the user's machine 140, the user 105 interacts with the web application 146. The device protocol translator 148 is a particular client side implementation of a HTTP device protocol. The web application 146 includes the device protocol translator 148 that accepts API calls 147 from the web application 146. The API calls 147 are described below in relation to Table 1 and FIG. 3. The device protocol translator 148 transmits commands using HTTP protocol 154 to a local hardware device server 156 for controlling various hardware devices such as sensors 130, processors 132 and storage devices 134 attached to the mobile hardware device 140. The various hardware devices are hardwired to interface with the hardware device servers 124, 156. The device protocol translator 148 may also transmits commands using HTTP protocol 136 to the remote hardware device server 124 for controlling various hardware devices such as sensors 130, processors 132 and storage devices 134 attached to remotely connected processing unit 120. The transmitted commands to the hardware device servers using HTTP protocol are described below in relation to Table 2. The sensor devices 130 may include cameras, microphones, GPS devices, accelerometers, and the like. Processor devices 132 may include other processor cores, graphical processor units, floating point processors, and the like. Storage devices 134 may include internal storage or various removable storage media. The remotely connected hardware device 120 also includes an operating system 122 for controlling operation of the remote hardware device server 124. The device protocol translator 148 may be implemented with a JavaScript library.

When a user 105 wants to access data from sensors 130, processors 132 and storage devices 134 attached to the user's machine 140 or the remotely connected processing unit 120, a web application 146 is sent from the web server computer 110 via the network 118 to the web browser 144 in the user's machine 140. The web browser 144 commands the web application 146 via the device protocol translator 148 to access the sensors 130, processors 132 and storage devices 134 connected to either the processing unit 140 or the remotely connected processing unit 120. The device protocol translator 148 then accesses a selected hardware device 130, 132, 134 in either the processing unit 140 or the remotely connected processing unit 120 via the hardware device servers 124, 156.

The hardware device servers 124, 156 are small native code applications that reside in separate processes from the web browser 144. They execute hardware requests on behalf of the web application 146 via the device protocol translator 148. The device protocol translator 148 authenticates requests from the authentication engines 128 of the hardware device servers 124, 156 for allowing authorized web domains access the hardware devices 130, 132, 134 attached to the user's machine 140 and the remotely connected processing unit 120. Device manifests, sensor widgets and authentication tokens may be used for authenticating requests. The hardware device servers 156, 124 have to be local to the hardware devices, but not local to client host 146.

Figure 1C:
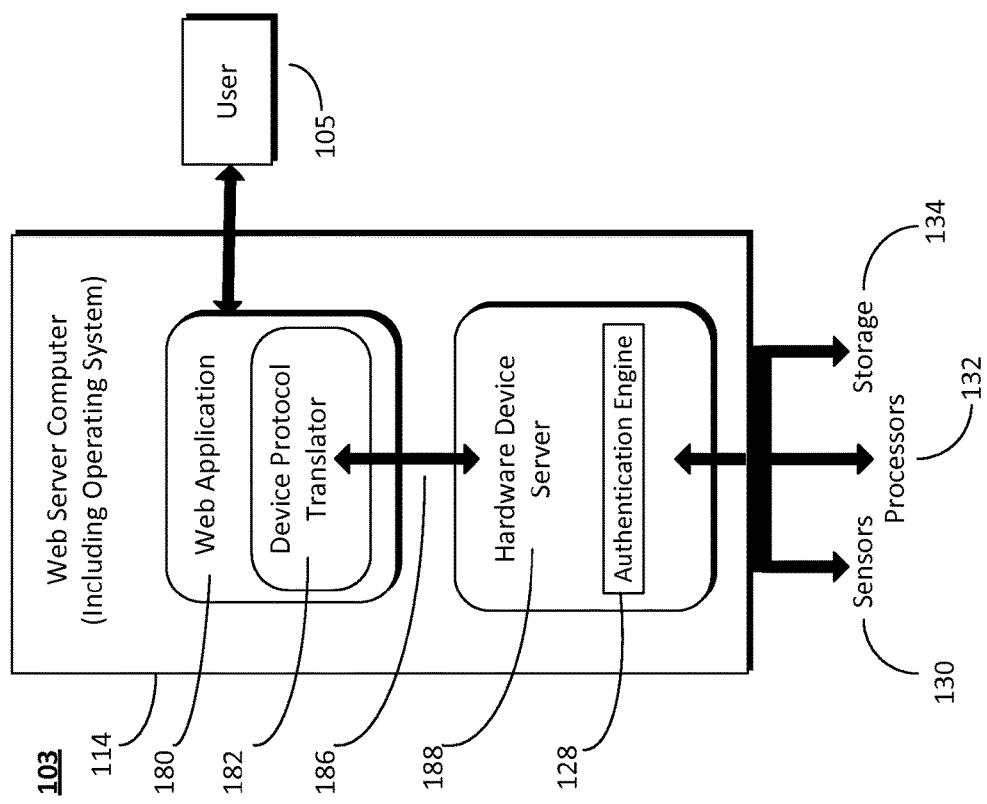
FIG. 1C is a functional diagram of a software architecture with a web server computer having an embedded hardware device server and web application for controlling sensors, processors and storage devices local to the web server.
Figure 1B:
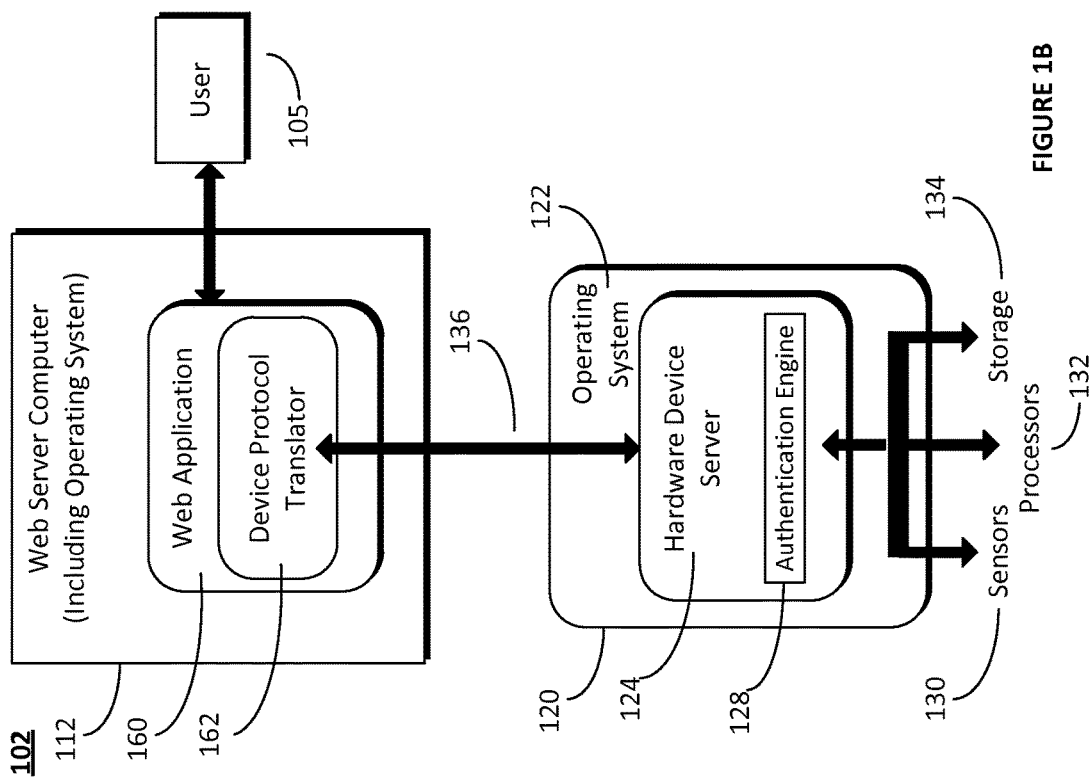
FIG. 1B is a functional diagram of a software architecture with a web server computer connected to a remotely connected processing unit for controlling sensors, processors and storage devices.

FIG. 1B is a functional diagram of a software architecture 102 where a web server computer 112 includes a web application 160 and device protocol translator 160 connected to a remote processing device 120. The web server computer 112 includes a web application 160 for accessing hardware devices and a device protocol translator 162 that presents an API to the web application 160. After the web server computer 112 instantiates a web application 160, the user 105 interacts with the web application 160. The device protocol translator 148 is a particular client side implementation of a HTTP device protocol. The device protocol translator 162 transmits commands using HTTP protocol 136 to a hardware device server 124 within the remotely connected processing unit 120. The hardware device server 124 is controlled by an operating system 122 and also includes an authentication engine 128. Before a web page 160 can access hardware devices, requests must be authenticated by the authentication engine 128 by identifying a requestor as being legitimate. The web server computer 112 includes an operating system that provides services to applications running on the web server computer 112.

FIG. 1C is a functional diagram of a software architecture 103 where a web server computer 114 includes an embedded hardware device server 188 and web application 180 for controlling sensors 130, processors 132 and storage devices 134 local to the web server computer 114. After the web server computer 114 instantiates a web application 180, the user 105 interacts with the web application 180. The web server computer 114 includes the web application 180 for accessing hardware devices and a device protocol translator 182 that presents an API to the web application 180. The device protocol translator 148 is a particular client side implementation of a HTTP device protocol. The device protocol translator 182 transmits commands using HTTP protocol 186 to a hardware device server 188 within the web server computer 114 for controlling various hardware devices such as the sensors 130, processors 132 and storage devices 134 attached to web server computer 114. The device server 188 also includes an authentication engine 128 for authenticating the requestor of hardware device server requests. The web server computer 114 includes an operating system that provides services to applications running on the web server computer 114.

Hardware Architecture

Figure 2A:
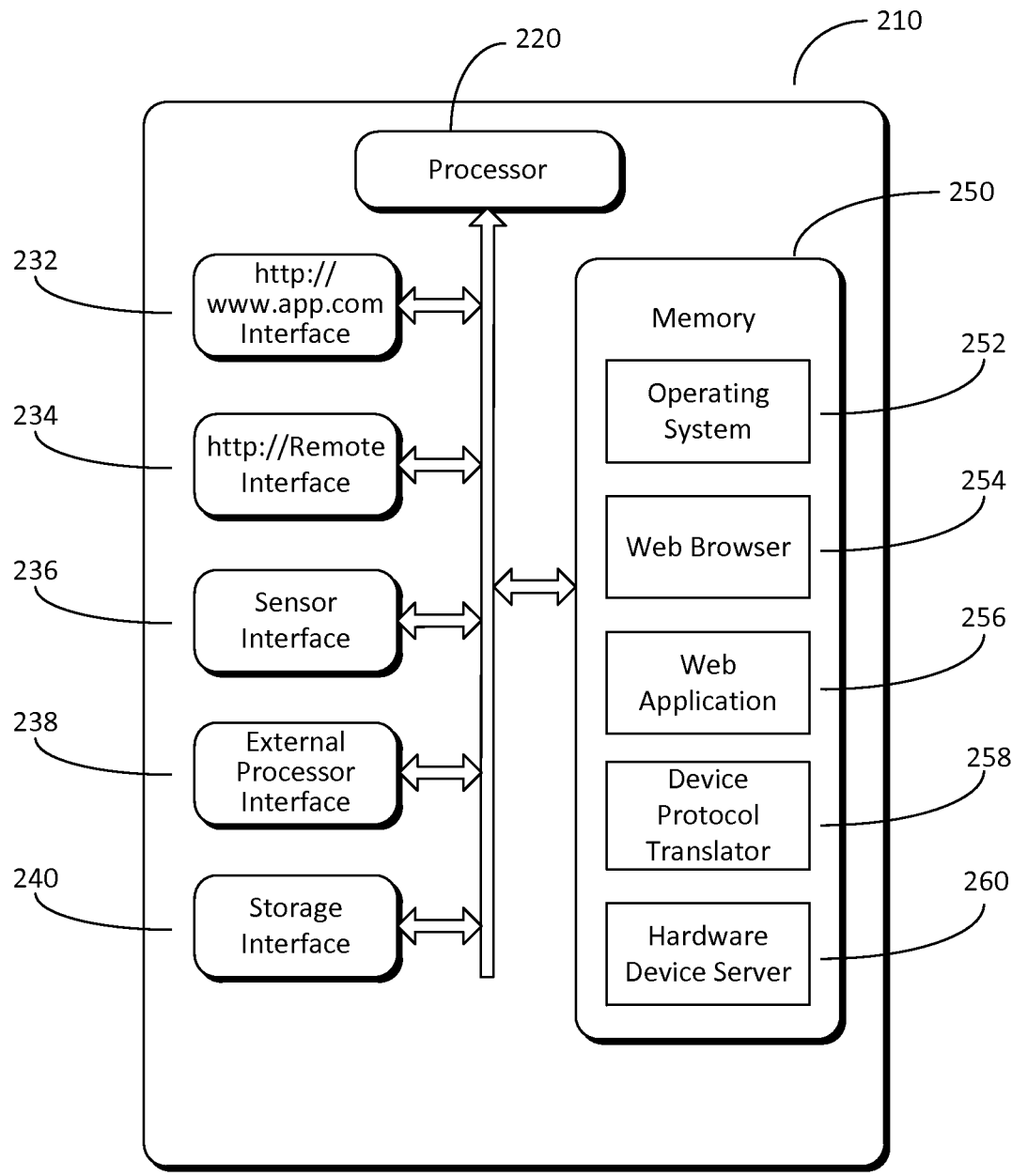
FIG. 2A represents an exemplary hardware block diagram of a processing unit and FIG. 2B represents an exemplary hardware block diagram of a remotely connected processing unit that may communicate with the processing unit for controlling sensors, processors and storage devices.
Figure 2B:
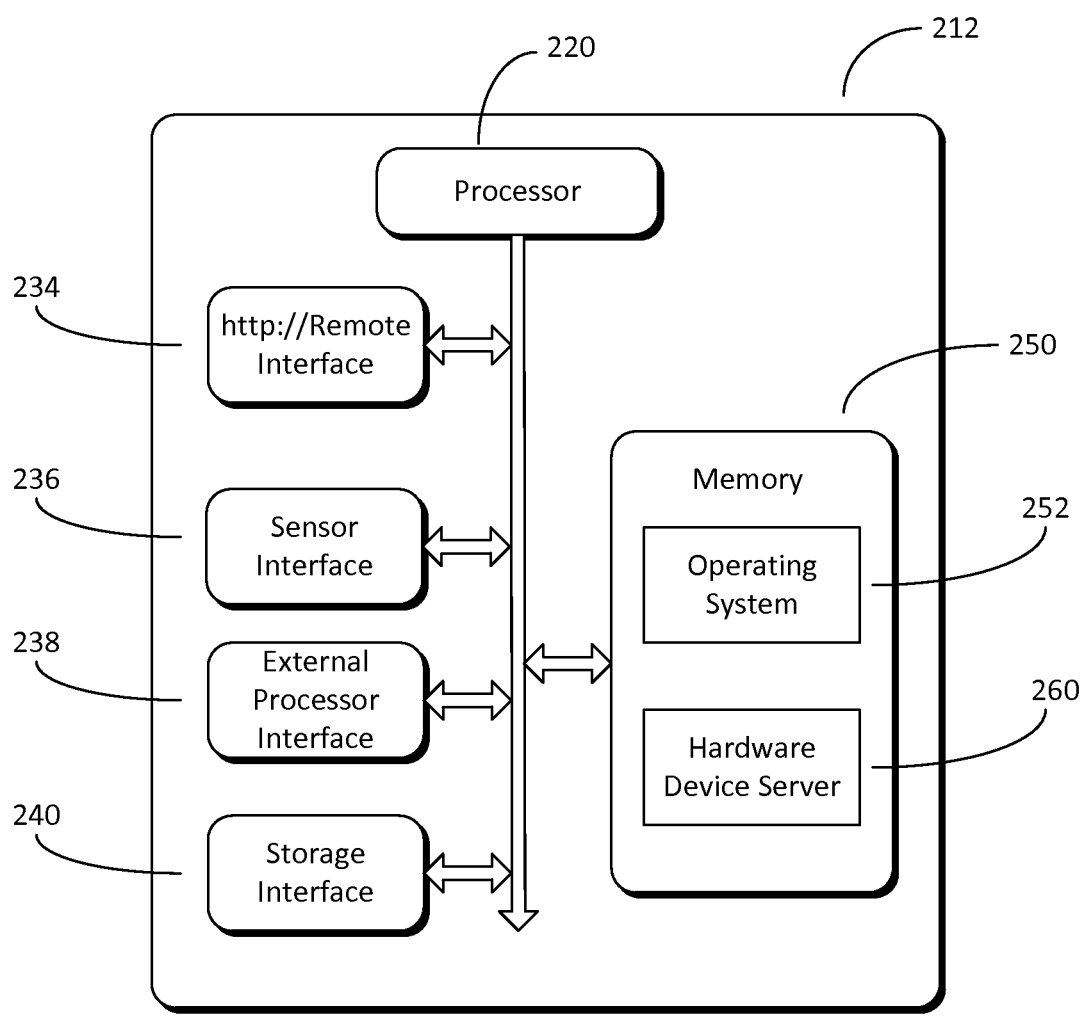

FIG. 2A and FIG. 2B are block diagrams 200, 202 of exemplary processing units 210, 212 for controlling sensors, processors and storage devices over the Internet and local to web server computers. FIG. 2A represents a configuration 210 with a capability of implementing the operations of a user's machine (140 in FIG. 1A) and FIG. 2B represents a configuration 212 with a capability of implementing the operations of the remotely connected processing unit (120 in FIG. 1A and FIG. 1B). FIG. 2B is a subset of the configuration shown in FIG. 2A, and operates in accordance with the description of FIG. 2A. The memory 250 shown in FIG. 2A may be a combination of volatile or non-permanent memory and non-volatile or permanent memory. Generally, the operating system 252, web browser 254 and hardware device server 260 are installed in non-volatile memory. The web application 256 and device protocol translator 258 located within the web application 256 are generally downloaded and installed in non-volatile memory. The processor 220 is controlled by the operating system 252, and controls the other functions shown in FIG. 2A. The web application interface 232 connects to a web server computer via the Internet, the remote interface 234 connects between a remotely connected processing unit and a local processing unit such as shown in FIG. 2B (120 in FIG. 1A and FIG. 1B), the sensor interface 236 connects to hardware sensor devices, the external processor interface 238 connects to processor hardware devices external to the user' 210 (or 212 in FIG. 2B), and the storage device interface 240 connects to hardware storage devices.

API Calls

The API calls merely represent examples of interfaces that a client application could invoke in order to access a hardware device server. Different applications may require definition of a different set of APIs. The API call definition is determined by the device protocol translator that connects to the hardware device server. Implementation of the device protocol translator for determining the selected API call may be by a JavaScript library.

Figure 3:
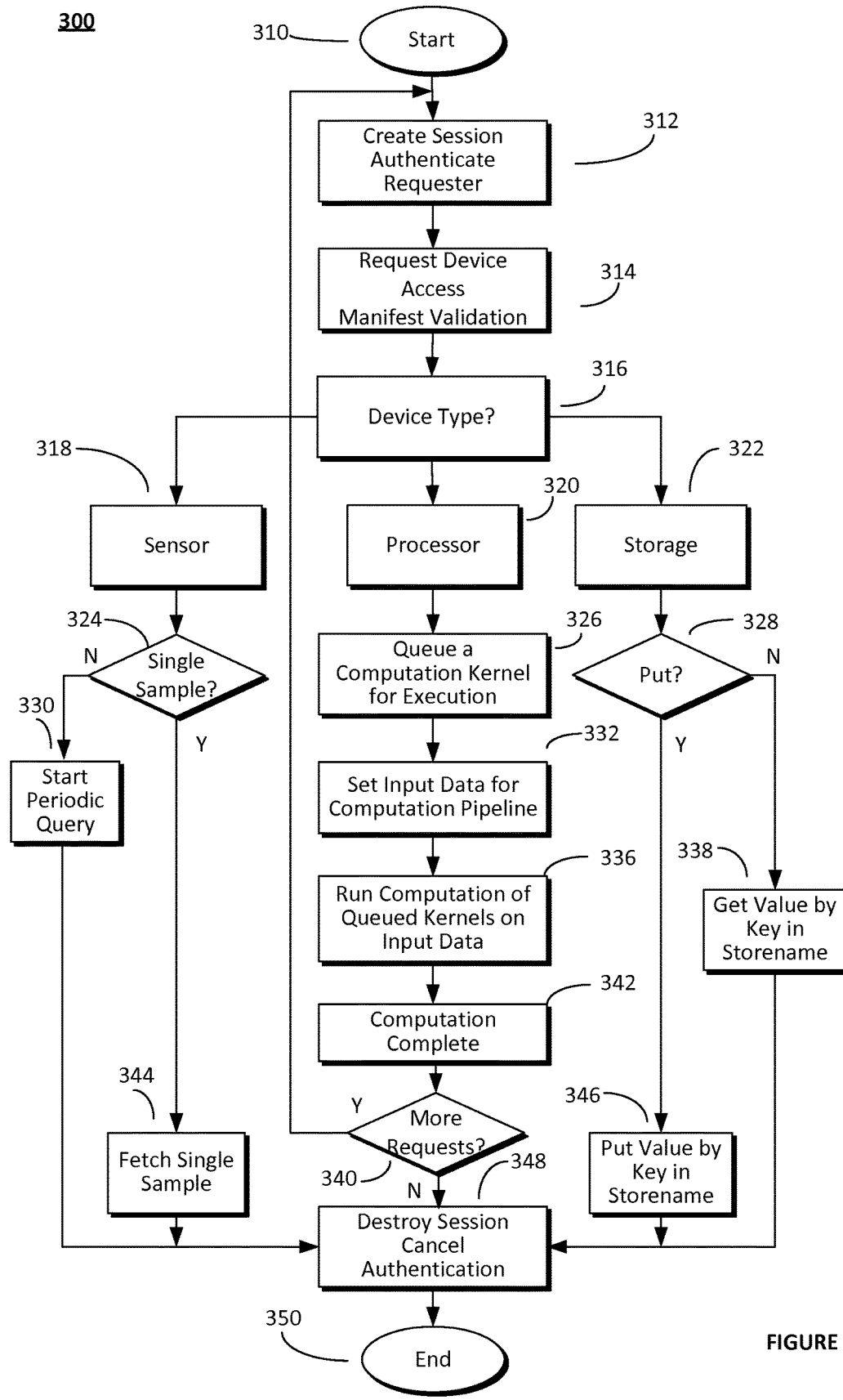
FIG. 3 is a flow chart illustrating an exemplary implementation of the operation of API calls to a device protocol translator for controlling sensors, processors and storage devices by a hardware device server.

Table 1 is a summary of exemplary API calls to a client side implementation of HTTP device protocol for accessing hardware devices via the hardware device server by a web application. FIG. 3 is a flow chart illustrating an exemplary implementation of the operation of API calls to the device protocol translator for implementation of HTTP device protocols for controlling sensors, processors and storage devices by a hardware device server. The API calls shown in Table 1 and illustrated in FIG. 3 define the interface (see 147 in FIG. 1) between a web application and the a device protocol translator (see 146 and 148, respectively, in FIG. 1). The process is started 310 when a requester application is authenticated and a session is created 312. All API calls require authentication and manifest validation 314 from a user to receive permission to access certain devices, as shown in the first and second set of calls in Table 1 and FIG. 3. Authentication is used for identifying a requestor as being legitimate while the session is open. A manifest is a list of devices that a page wishes to access. A manifest validation is an authorization by a user for a requesting domain to access specific hardware devices. Before a web page can initiate hardware requests to the device protocol translator 310, it must be authenticated via createSession ( ) 312, which authenticated the legitimacy of the web page. Then it must send its device manifest to the hardware device server via requestAccess ( ) 314. The hardware device server presents the manifest to the user and asks for validation of the requested hardware permissions if the user has not previously validated the hardware permissions to the hardware device server. Prior to granting each device request, each request is requires authentication and validation 312, 314, 340. Upon completion of a session and there are no more requests 340, the API call destroySession ( ) cancels authentication 348 and ends the session 350. If the hardware device server does not receive a valid authentication or manifest validation, it ignores the createSession ( ) call.

TABLE 1

| CALL | DESCRIPTION |
| --- | --- |
| 1 createSession ( ) | Authenticate requester. |
| destroySession ( ) | Cancel authentication. |
| 2 requestAccess (manifest) | Ask for permission to access certain devices. |
| 3 singleQuery (name, params) | Get a single sensor sample. |
| continuousQuery (name, params, period) | Start periodic fetch of sensor samples. |
| 4 startSensor (name) | Turn on sensor. |
| stopSensor (name) | Turn off sensor. |
| sensorAdded (name) | Upcall fired when a sensor is added. |
| sensorRemoved (name) | Upcall fired when a sensor is removed. |
| getSensorList ( ) | Get available sensors. |
| 5 enqueueKernel (kernel) | Queue a computation kernel for execution. |
| setKernelData (parameters) | Set the input data for the computation pipeline. |
| executeKernels ( ) | Run the queued kernels on the input data. |
| 6 put (storename, key, value) | Put value by key. |
| get (storename, key) | Get value by key. |

Sensor API

The API may control several device types 316. To provide access to sensors 318 like cameras, accelerometers, and GPS units and the like, the API provides a single-sample query interface 324, 344 and a continuous query interface 324, 330 as shown in the third set of calls in Table 1 and in FIG. 3. The API calls singleQuery (name, params) and continuousQuery (name, params, period) accept an application-defined callback which is invoked when the data has arrived from the sensor. The data, for example, may be picture information if the sensor is a camera or position information if the sensor is a GPS receiver. The singleQuery (name, params) call accepts the name of the sensor device to query and a device-specific params value which controls sensor-specific properties such as audio sampling rate of data from a microphone. The continuousQuery (name, params, period) call also accepts the name of the sensor device to query and a device-specific params value, and also includes an additional parameter representing the period of the sampling rate frequency for continuous query calls when the continuous query is started 330.

The fourth set of calls in Table 1 and shown in FIG. 3 provide a sensor management interface. The API calls startSensor (name) and stopSensor (name) provide power controls that allow a web page to turn on or shut off devices that is not needed. The hardware device server ensures that a device is left on if at least one application still needs it. The API calls sensorAdded (name) and sensorRemoved (name) let applications register callbacks which provide notification to the application when devices arrive or leave. These events are common for off-platform devices such as Bluetooth headsets and some shoe sensors that track motion and distance traveled of the individual wearer. Inserting and removing USB port devices may also cause callbacks to provide notification of this status in some applications. The API call getSensorList ( ) produces a list of all available sensors available to a hardware device server.

Processor API

Multi-core processors and programmable GPUs 320 are available on desktops and transitioning to mobile devices. Simple multi-processor computing models are available for exporting to mobile devices. A kernel represents a computational task to run on a core. Kernels are restricted to executing two types of predefined functions, primitive functions and built-in functions. Primitive functions are geometric, trigonometric, and comparator operations. Built-in functions are higher-level functions that have been identified as being particularly useful for processing hardware data, and may include the use of primitive functions. For example, built-in functions may include Fast Fourier Transform signal transforms and matrix operations.

Considering the fifth set of calls in Table 1, a web page passes a kernel to the API by calling enqueueKernel (kernel), 326 as shown in FIG. 3. To execute a parallel vector computation with that kernel, the web page calls setKernelData (parameters) with vector arguments 332. A new copy of the kernel will be instantiated for each argument, the kernels being run in parallel. A web page can also create a computational pipeline by calling enqueueKernel (kernel) multiple times with the same or different kernel. The kernels inputs and outputs will be chained in the order that the kernels were passed to enqueueKernel (kernel). The web page sets the input data for the pipeline by passing a scalar value to setKernelData (parameters). Once an application has created its kernels and set their input data, it calls execute-Kernels ( ) to start the computation to run the queued kernels on the input data 336. The kernels are distributed to various cores in the system, cross-kernel communication is coordinated, and an application-provided callback is executed when the computation is complete 342.

Storage API

The sixth and final set of API calls in Table 1 and FIG. 3 provide a key/value storage interface 322. The namespace is partitioned by web domain and by storage device. A web domain can only access data that resides in its partitions. To support removable devices, connection and disconnection notification events are provided similar to off platform sensors. The API call put (storename, key, value) stores a value by key in storename 328, 346, and get (storename, key) accesses a value by key in storename 338.

Authenticating Hardware Requests

Privilege separation is used to provide a web page with hardware access while reducing security vulnerabilities. It lets parts of an application run with different levels of privilege, which may be used to prevent non-privileged or low-privileged parts of an application from gaining unauthorized access to parts with higher privileges. The web page and an enclosing web browser that executes the page's code are both considered to be untrusted. The web browser is placed in a sandbox which limits its access to certain services, including preventing direct access to hardware devices controlled by the hardware device server. The small, native code hardware device server resides in a separate process from the web browser, and executes hardware requests on behalf of the device protocol translator embedded within the web page application and browser, exchanging data with the device protocol translator via HTTP protocol and HTTP commands. The device protocol translator defines and implements the API described above. It provides for authentication purposes and translates page-initiated hardware requests into HTTP fetches. The hardware device server requires three housekeeping tasks to occur prior to enabling access to the hardware devices. These tasks include manifest authorization, session establishment and session teardown. It should be noted that remote or off-platform devices (see 120 in FIG. 1) are seamlessly accessed in the same manner as the local devices.

Figure 4:
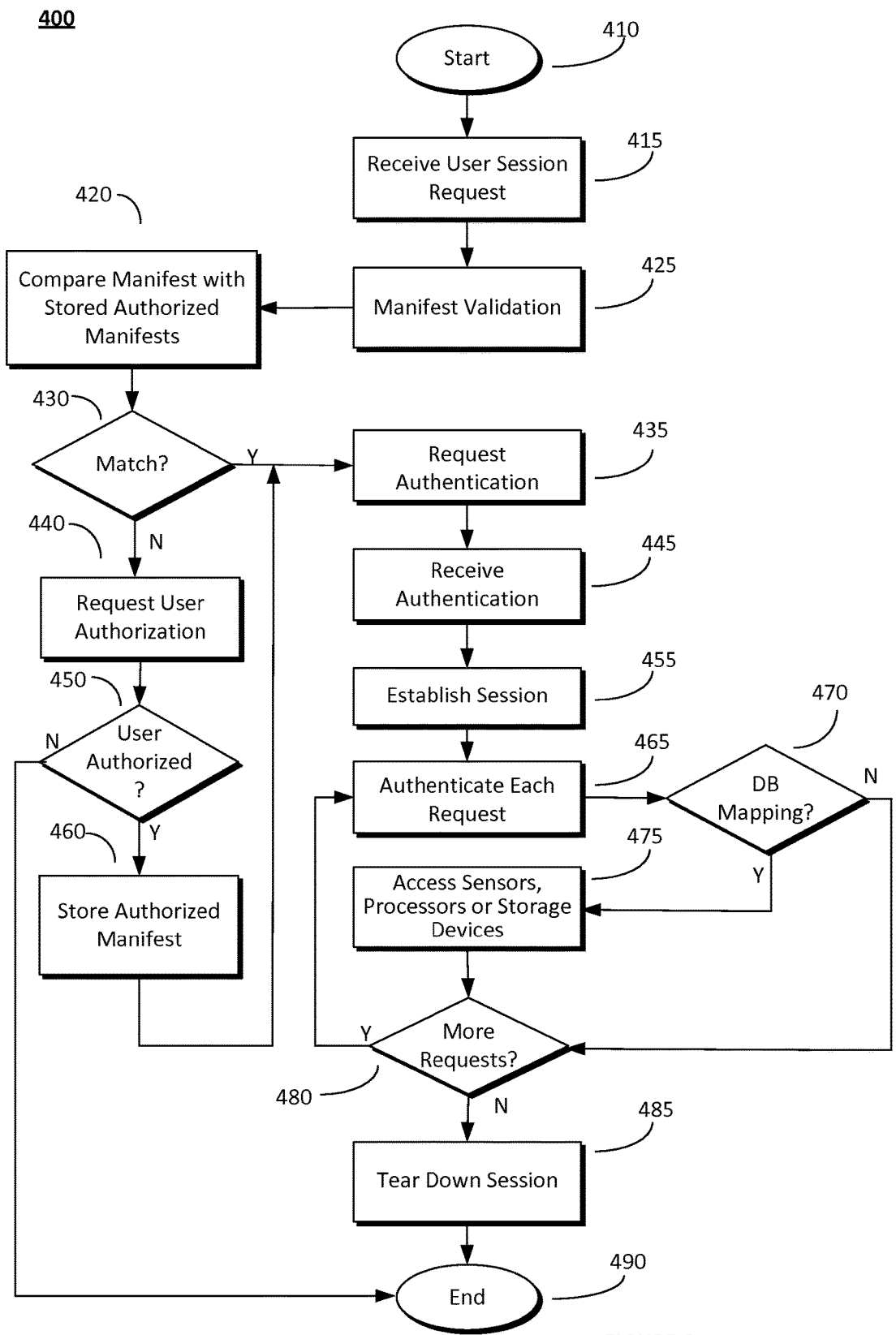
FIG. 4 is a flow chart illustrating an exemplary implementation of the operation of the hardware device server.

FIG. 4 is a flow chart illustrating an exemplary implementation of the operation of a hardware device server. It represents an exemplary life cycle of a session of the hardware device server. At the start of a session 410, the hardware device server receives request to create a session 415. To create a session, a manifest validation 425 and requester authentication 435 are required to allow access to certain devices. A manifest validation 425 is an authorization by a user for allowing a requesting domain to access specific hardware devices. Upon receipt of a request for a session 415 by the hardware device server from a web page, the web page includes a device manifest in its HTTP request. The manifest is merely a list of devices that the page wishes to access. The hardware device server compares the received manifest with previously stored authenticated manifests 420. If a match is found between the received manifest and a stored manifest 430, the next step of creating a new capability token and sending it to the requesting domain 435 is conducted. If a match is not found 430 (normally because this is the first time the web page is requesting a session), the hardware device server presents this new manifest to the user (105 in FIG. 1) and requests a grant of the specified access permissions to the web page's domain 440. If the requested manifest permission is authenticated by a grant from the user 450, the hardware device server stores the authenticated manifest 460 in a database and continues to the next step of requesting authentication from the user 435. If the user does not authenticate the request, the session is ended 490. If a web page requests access to a new device, the manifest will be authenticated as previously described. Subsequent web page requests 480 for devices in the manifest will not require explicit user action. The manifest validation and request authentication 465 are implemented by the authentication engine (128 in FIG. 1) within the hardware device server.

If the manifest is authorized 450, the hardware device server sends an authentication request to the requesting domain 435. Any subsequent request by the requesting web page must be authenticated by comparing the received authentication with a previously stored corresponding authentication 470. Authentication must be received 445 before a session may be established 455.

Before a web page can open a session and initiate hardware requests to the device protocol translator, it must get a new authentication from the hardware device server 435. Once a session is established 455, each request must be authenticated 465 by comparing the received authentication with a corresponding authentication stored in memory 470. If a mapping does not exist between the received authentication and that stored in memory, the request is ignored by the hardware device server 470, 485. Authentication identifies a requestor as being legitimate for every request made while the session is open. If a mapping does exist between the received authentication and that stored in memory 470, the request is validated and the appropriate hardware device is accessed 475. If additional requests are made 480, another authentication 465 is required. Upon receipt of a request to terminate the session 480, access to the selected hardware device is terminated and the session is ended 485.

Since the hardware device server receives requests expressed as HTTP fetches, a natural way for the hardware device server to authenticate requester identification is to inspect the referrer field in the HTTP request. This is a standard HTTP field which indicates the URL, and thus the domain, of the page that generated the request. Unfortunately, a misbehaving browser can subvert this authentication scheme by examining which domains successfully receive hardware data, and then generating fake requests containing these snooped referrer fields. This is essentially a replay attack on a weak authenticator.

To prevent these replay attacks, the hardware device server grants authentication to each authorized domain to prevent access by unauthorized domains. Before a page in a trusted domain can access the hardware device server, it must send a session establishment message 415 to the hardware device server. The hardware device server examines the referrer of the HTTP message and checks whether the domain has already been granted authentication. If not, the server generates an authentication, stores the mapping between the domain and that authentication, and sends the authentication to the page. Later, when the page sends an actual hardware request to establish a session 455, it includes the authentication in its HTTP request. If the authentication does not match the mapping found in the hardware device server's table 470, the hardware device server ignores the hardware request 485. If the authentication does match 470, a session may be established 455 and access to sensors, processors and storage devices is enabled 475.

A page sends a session tear down message to the hardware device server 480 when it no longer needs to access hardware attached to the hardware device server. Upon receipt of the tear down message 480, the server deletes the relevant domain/token mapping and the session ends 485. The device protocol translator detects when a page is about to unload by registering a handler for the device protocol translator unload event.

Given the capability scheme, a misbehaving browser that can only spoof referrers cannot fraudulently access hardware, since the browser must also steal another domain's token or retrieve a new one from the hardware device server. However, nothing prevents a browser from autonomously downloading a new authentication in the background under the guise of an authorized domain, and then using this authentication in its HTTP request to the hardware device server.

Although the device protocol translator hides the details of the HTTP protocol used for accessing the hardware device server from the web application, the web application can still issue HTTP requests directly to the hardware device server without going through the device protocol translator. This may disrupt logic in the device protocol translator that buffers device output or otherwise attempts to optimize device accesses. If the browser is not compromised, access attempts can be forced to go through the device protocol translator using techniques by splitting the device protocol translator into two pieces, the public component that exports a standardized interface and a private component that is generated by the hardware device server and handles platform-specific optimizations and quirks. For example, if the device protocol translator is implemented as a JavaScript library running inside a web browser, the library can create an HTML frame in the localhost domain that cannot be accessed by the outer application frame that runs in the domain of the application's originating web server. The private component can be placed in the localhost frame, and the public component can be placed in the enclosing application frame, allowing the two frames to pass messages to each other, but keeping secrets in the localhost frame safe from the untrusted outer frame. The application passes device access requests to the public component; in turn, the public component passes the request to the private component. The private component, which has established a secret with the device server, includes this secret in the forwarded application-generated device request. Thus, the device server can detect that the request originated from the private component, and not from a web application that is trying to directly issue requests without going through the device protocol translator.

Hardware Device Server Implementation

The device protocol translator encodes device requests to the hardware device server as HTTP commands using simple XML strings embedded in HTTP requests. Whereas API calls (147 in FIG. 1) constitute the interface between a web application (146 in FIG. 1) and the device protocol translator (148 in FIG. 1), the HTTP commands (154 and 136 in FIG. 1) described herein constitute the interface between the device protocol translator (148 in FIG. 1) and the hardware device server (156 and 124 in FIG. 1). The API calls shown in Table 1 and illustrated in FIG. 3 define the interface (see 147 in FIG. 1) between a web application and the device protocol translator (see 146 and 148, respectively, in FIG. 1). The device protocol translator (148 in FIG. 1) transmits commands using HTTP protocol (154 and 136 in FIG. 1) to a local hardware device server and remotely connected hardware device server (124 and 156 in FIG. 1) for controlling various hardware devices. The commands using HTTP protocol are described below in relation to Table 2. Table 2 is an XML template for accessing the hardware device server.

An exemplary XML string for a command sent to a hardware device server from a device protocol translator requesting an action and a corresponding result sent from the hardware device server to the device protocol translator that includes audio data generated by a microphone are shown in Table 2. Each request includes a command and a corresponding result. A command may include a security authenticate as described above, an action to be performed such as "record", a target device such as a "microphone", and optional device-specific params field such as recording "durationLength" and optional data field to be sent to recipient devices such as memory devices. The optional data field is not used in this example. When a hardware device server responds to a command, the responses are also encoded as a simple XML string. In response to the exemplary command shown in Table 2, a result may be returned to the device protocol translator from the hardware device server that may include a value field indicating whether the associated command succeeded or failed. The result may also include a data field such as the requested audio data from a microphone.

TABLE 2

```
<command>
    <authenticate>0fdb53ac3d2...</authenticate>
    <action>record</action>
    <device>microphone</device>
    <params>durationLength=10</params>
    <data></data>
</command>
<result>
    <value>OK</value>
    <data>bcd32abfe029e...</data>
</result>
```

On the client side, the device protocol translator encapsulates the low level decoding routines and other protocol functionality and responds to API calls from a web page with any requested data or status information.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A method for accessing hardware devices by a hardware device server, the method comprising:
  receiving a Hypertext Transfer Protocol (HTTP) request by the hardware device server from a device protocol translator that accepts application programming interface (API) calls from a requesting application for initiating hardware device access and receiving any resulting status and data, the request including a requested action to be taken and an identified hardware device for performing the requested action to be taken, the hardware device server being local to the identified hardware device;

authenticating the HTTP request from the device protocol translator by the hardware device server;

sending commands for the requested action to be taken to the identified hardware device from the hardware device server;

receiving a response from the identified hardware device by the hardware device server, the response including a status indication of whether the requested action succeeded and any received device data as a result of the requested action; and sending a HTTP result to the device protocol translator by the hardware device server, the result including the received status indication and the received device data, the device protocol translator being included in the requesting application.

2. The method of claim 1, wherein the hardware device server is selected from the group consisting of a local hardware device server that is located locally to the requesting application and the device protocol translator and a remote hardware device server that is located remotely from the requesting application and the device protocol translator.

3. The method of claim 1, wherein:
receiving the HTTP request includes receiving device specific parameters and a data request, and
sending commands for the requested action to be taken includes sending the device specific parameters and the data request.

4. The method of claim 1, wherein the identified hardware device is selected from the group consisting of sensors, processors, storage devices, cameras, microphones, GPS units, accelerometers, other processor cores, graphical processing units, internal memory devices and removable memory devices.

5. The method of claim 1, further comprising:
authenticating that the request from the requesting application is allowed.

6. The method of claim 5, wherein:
authenticating that the request from the requesting application is allowed includes authenticating the HTTP request from the requesting application and providing security, including using manifest authorization, security token exchanges, sensor widget notification and iframes for device handling encapsulation.

7. The method of claim 1, wherein:
receiving the HTTP request from the application comprises receiving HTTP commands as a hardware access protocol.

8. The method of claim 1, wherein:
authenticating the HTTP request from the device protocol translator by the hardware device server includes checking a referrer field included in the HTTP request.

9. The method of claim 8, wherein the device protocol translator is configured to access local hardware device servers and remote hardware device servers.

10. The method of claim 1, wherein:
the requested action to be taken includes a requested action of fetching a single sample from an identified sensor.

11. The method of claim 1, wherein:
the requested action to be taken includes a requested action of starting a periodic query of an identified sensor by turning on an identified sensor for a predetermined period of time and by turning off the identified sensor after the predetermined period of time.

12. The method of claim 1, wherein:
The requested action to be taken includes a requested action of queuing a computation kernel for execution by an identified processor, setting input data for a computation pipeline, and running a computation of queued kernels on the input data.

13. The method of claim 1, wherein:
the requested action to be taken includes a requested action for putting a value by key in an identified storage device.

14. The method of claim 1, wherein:
the requested action to be taken includes a requested action for getting a value by key in an identified storage device.

15. A system for accessing one or more hardware devices using arbitrary network protocols, the system comprising:
one or more device processors; and
a non-volatile memory storing computer-executable instructions for execution by the one or more device processors, for implementing:
a hardware device server that is operable to provide mediation, via at least one of the one or more device processors, for enabling hardware devices that are local to the hardware device server to respond to network protocol commands, by:
receiving requests, as network protocol commands, using Hypertext Transfer protocol (HTTP) requests, from a device protocol translator that accepts application programming interface (API) calls from a requesting application for initiating hardware device access via the HTTP requests and receiving any resulting status and data, the requests including requested actions to be taken by the hardware devices, the device protocol translator being included in the requesting application,
authenticating the HTTP requests from the device protocol translator by the hardware device server,
sending commands for the requested actions to be taken to the hardware devices, and
sending results, in network protocol format, as results in HTTP format, to the device protocol translator, the results including status indications and device data received from the hardware devices.

16. The system of claim 15, wherein:
the hardware device server is operable to execute as a simple native code application in a separate process on a local machine and to export a web server interface on the local machine.

17. The system of claim 15, wherein the hardware device server is operable to receive the network protocol commands for performing operations on attached hardware devices and returning requested data via the network protocol commands.

* * * * *